(12) United States Patent
Kraemmer et al.

(10) Patent No.: US 6,807,325 B1
(45) Date of Patent: Oct. 19, 2004

(54) BRAGG GRATING DEVICE FOR MEASURING AN ACCELERATION

(75) Inventors: Peter Kraemmer, Erlangen (DE); Michael Willsch, Fürth (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/979,345

(22) PCT Filed: Apr. 28, 2000

(86) PCT No.: PCT/DE00/01347
§ 371 (c)(1),
(2), (4) Date: Nov. 20, 2001

(87) PCT Pub. No.: WO00/72025
PCT Pub. Date: Nov. 30, 2000

(30) Foreign Application Priority Data

May 21, 1999 (DE) ......................................... 199 23 448

(51) Int. Cl.[7] ............................ G02B 6/00; G02B 6/34
(52) U.S. Cl. ...................... 385/13; 385/37; 250/227.18; 73/1.41
(58) Field of Search ........................ 250/227.14, 227.16, 250/227.18, 227.23, 227.28, 227.17; 385/12–13, 37; 73/1.41, 1.85

(56) References Cited

U.S. PATENT DOCUMENTS

| | | | | |
|---|---|---|---|---|
| 5,394,488 A | * | 2/1995 | Fernald et al. ................. | 385/13 |
| 5,426,297 A | * | 6/1995 | Dunphy et al. ........ | 250/227.23 |
| 5,892,860 A | * | 4/1999 | Maron et al. ................... | 385/12 |
| 6,575,033 B1 | * | 6/2003 | Knudsen et al. .......... | 73/514.26 |

FOREIGN PATENT DOCUMENTS

| | | | | |
|---|---|---|---|---|
| GB | 2323441 A | * | 9/1998 | .......... G01D/5/353 |
| WO | WO-99/39214 | * | 5/1999 | ........... G01P/15/08 |

OTHER PUBLICATIONS

"Spatial and Wavelength Multiplexing Architectures for Extreme Strain Monitoring System Using Identical-Chirped-Grating-Interrogation Technique." Zhang et al., 12th Int'l Conf. on Optical Fiber Sensors, Oct. 28–31, 1997, pp. 452–455.*

"Experimental Demonstration of a Fiber Bragg Grating Accelerometer." Berkoff, T.A. and A.D.Kersey, IEEE Photonics Technology Letters, vol. 8, No. 12, Dec. 1996, pp. 1677–1679.*

"High–g accelerometer based on in–fiber Bragg grating: a novel detection scheme." Therialt, S. et al. 926/SPIE vol. 3491.*

Performance of Elastic Beam Fiber Bragg Grating Accelerometers, Todd, M.D. et al., US Naval Research Laboratory, Cod 5670, Washington, D.C. 20375 USA.*

Storgaard–Larsen, Torben, et al. "Opto–mechanical accelerometer based on strain sensing by a Bragg grating in a planar waveguide." Sensors and Actuators A 52 (1996) 25–32.*

Xu, M.G., et al. "Thermally–compensated bending gauge using surface–mounted fibre gratings." International Journal of Optoelectronics, 1994, vol. 9, No. 3, pp. 281–283.*

"Feasability study concerning optical fiber sensor vibration monitoring subsystem." Dumphy, J.R. SPIE vol. 2721, pp. 483–492.*

"Fiber Bragg Grating Array Sensor System Using a Bandpass Wavelength Division Multiplexer and Interferometric Detection." Berkoff, T.A. and A.D. Kersey, IEEE Photonics Technology Letters, vol. 8, No. 11, Nov. 1996.*

"Experimental Demonstration of a Fiber Bragg Grating Accelerometer" by T.A. Berkoff and A.D. Kersey; IEEE Photonics Technology Letters, vol. 8, No. 12, Dec. 1996, pp. 16771679.

* cited by examiner

Primary Examiner—David V. Bruce
Assistant Examiner—Thomas R Artman
(74) Attorney, Agent, or Firm—Baker Botts LLP

(57) ABSTRACT

The Bragg grating device for measuring an acceleration, has at least two optical Bragg gratings (11, 12), each formed in elastic material, for supplying optical radiation (S) and at least one deflectable mass (M) connected to both gratings for generating an inertial force that is dependent on the acceleration which acts upon the device, in order to produce elastic extension of one of the two gratings and simultaneous elastic contraction of the other grating. The device is also suitable for vibration frequency measurement.

7 Claims, 3 Drawing Sheets

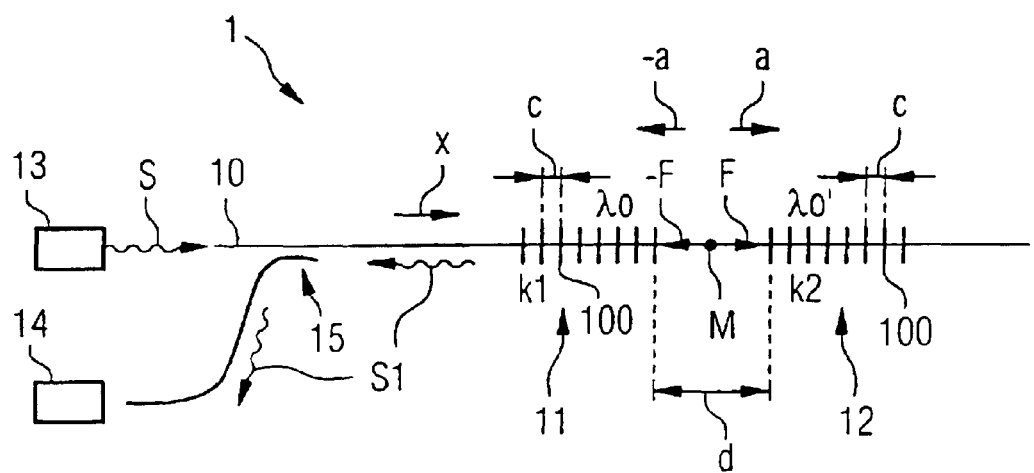
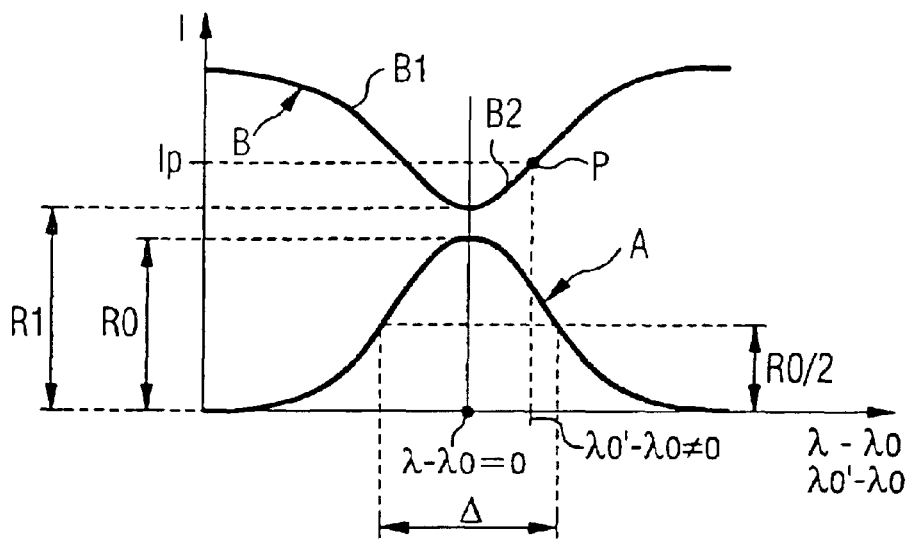

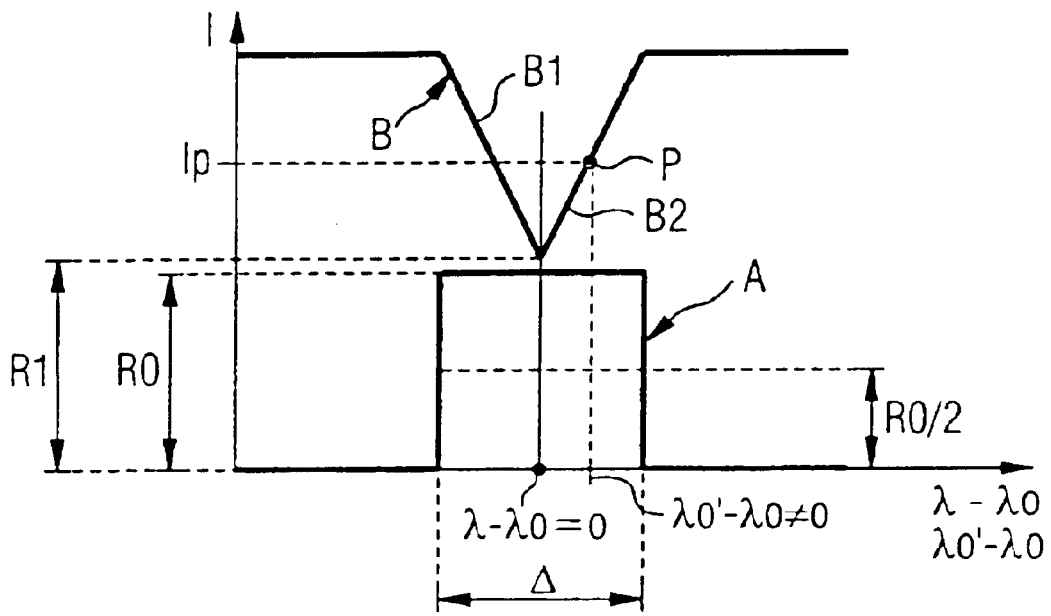
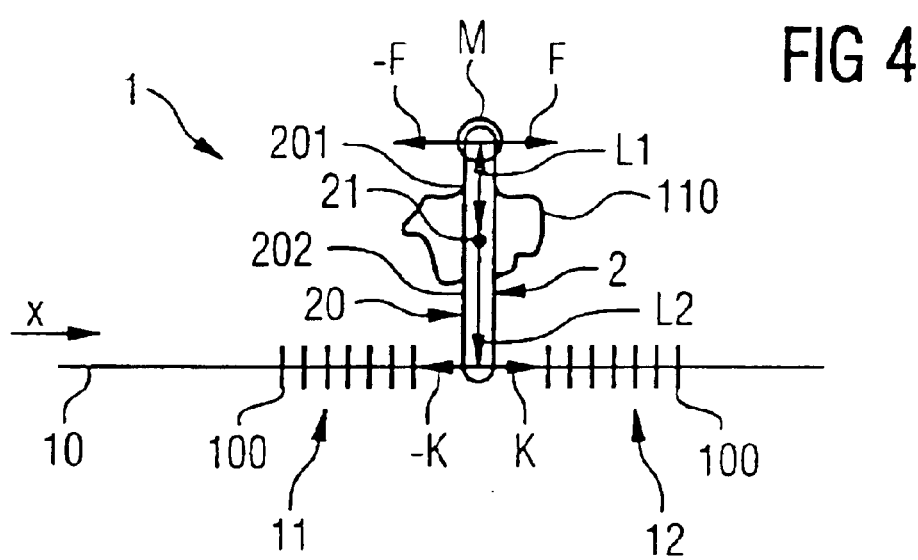

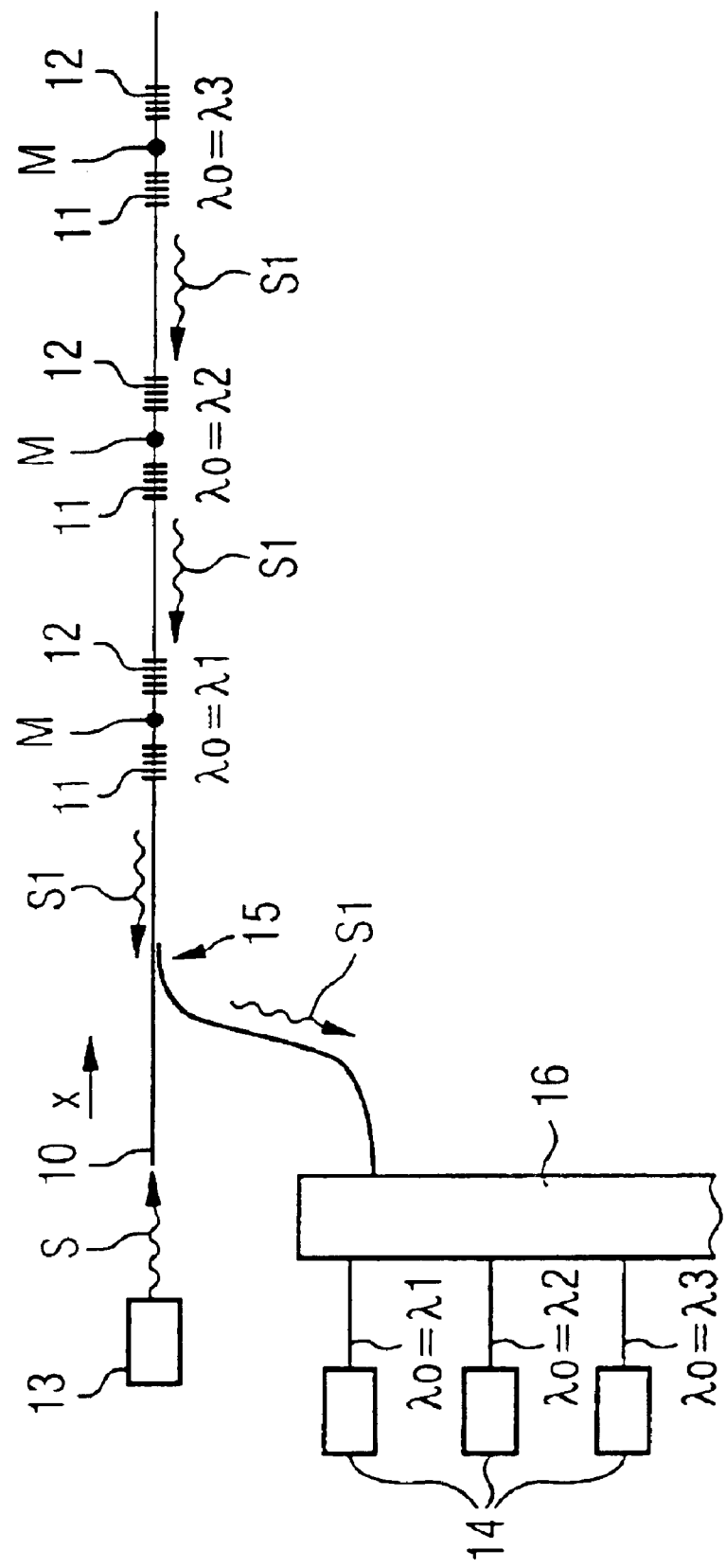

BRAGG GRATING DEVICE FOR MEASURING AN ACCELERATION

FIELD OF THE INVENTION

The invention relates to a Bragg grating device for measuring an acceleration.

BACKGROUND OF THE INVENTION

The paper by T. A. Berkoff, A. D. Kersey: "Experimental Demonstration of a Fiber Bragg Grating Accelerometer", IEEE Photonics Technology Letters, Vol. 8, No. 12, December 1996, pages 1677–1679, discloses a Bragg grating device for measuring an acceleration which has:

an optical Bragg grating, formed in elastic material, for supplying light, and a deflectable mass connected to the grating for generating an inertial force that is dependent on the acceleration which acts on the mass, in order to produce elastic extension of the grating.

The connection between the mass and the grating is produced by a resilient layer, which is supported by a fixed baseplate and in which the grating is embedded. The extension of the grating is produced by the mass moving, in particular vibrating, at right angles to the direction of this extension.

The known device is operated as follows: light from a broadband source is supplied to the grating. The grating reflects a proportion of the light supplied at a grating-specific Bragg wavelength, which changes with the extension of the grating. The extension of the grating is produced by the inertial force generated by the mass, which is proportional to the acceleration that acts on the device and is to be measured. The reflected proportion of the light is supplied to an evaluation device, which determines which Bragg wavelength is contained in this proportion.

The evaluation device has a Mach-Zehnder interferometer having two arms of mutually different optical length. The reflected proportion of the light is coupled into the two arms, superimposed after passing through the two arms and is brought to interference and then fed to a detector. The determination of the Bragg wavelength contained in the reflected proportion is carried out with the aid of a phase modulator arranged in one of the two arms for the phase modulation of the part of the reflected proportion of the light that is guided in this arm relative to the part of this proportion which is guided in the other arm.

In the publication by J. R. Dunphy: "Feasibility study concerning optical fiber sensor vibration monitoring subsystem" in SPIE Vol. 2721, pp. 483–492, a Bragg grating device for vibration monitoring is described, which has at least one optical Bragg grating formed in elastic material for supplying light. In this case, evaluation devices for measuring the grating-specific Bragg wavelength of the grating are considered and compared with each other, said devices having a spectrometer, an interference filter, a tunable fiber grating, a scanning Fabry-Perot filter, a wavelength-dispersive element with a sampled detector or a tuned acousto-optical filter.

For a Bragg grating device having four Bragg gratings, among these evaluation devices, one device is viewed as relatively advantageous which, for each grating, has a tuned acousto-optical filter for evaluating the proportion of the light supplied and reflected by this grating with regard to the grating-specific Bragg wavelength contained in this proportion.

The publication by L. Zhang et al: "Spatial and Wavelength Multiplexing Architectures for Extreme Strain Monitoring System using Identical-Chirped-Grating-Interrogation Technique", in 12th International Conference on Optical Fiber Sensors, Oct. 28–31, 1997, pp. 452–455, reveals that the reflectivity R of a Bragg grating is a function both of the wavelength and also of the stress on the grating.

In this case, in a limited wavelength range around a grating-specific central Bragg wavelength, the reflectivity is greater than zero and essentially equal to zero outside this range. As the stress changes, the entire wavelength range is displaced linearly.

When "chirped" Bragg gratings are used, that is to say gratings with a varying grating constant, a reflectivity R of the grating can be obtained which depends on the wavelength approximately in the form of a rectangular curve, so that the reflectivity within the wavelength range is substantially constant.

SUMMARY OF THE INVENTION

The object of the invention is to provide a Bragg grating device for measuring on acceleration which permits particularly simple evaluation.

To solve this problem, the Bragg grating device for measuring an acceleration according to the invention has at least two optical Bragg gratings, each formed of elastic material, for supplying optical radiation, and at least one deflectable mass connected to both gratings for generating an inertial force that is dependent on the acceleration which acts upon the device, so as to produce elastic extension of one of the two gratings and simultaneous elastic contraction of the other grating.

The solution achieved by the present invention applies, inter alia, to the case that often occurs in which on one occasion, the inertial force that is exerted produces a state of deformation of the two gratings in which one of the two gratings is extended elastically while, at the same time, the other grating is contracted elastically and, on another occasion, a state of deformation of the two gratings which is different from this state of deformation is produced, in which, conversely, the other grating is extended elastically and, at the same time, the one grating is contracted elastically. In particular in the case of accelerations in the form of vibrations, the case therefore occurs in which the one and the other states of deformation of the two gratings alternate.

As used herein, elastic material means a material in which the inertial force generated can produce such a large elastic deformation that a change produced by this deformation in a grating constant of the Bragg grating produces a measurable change in the grating-specific Bragg wavelength of a grating.

Deflectable mass as used herein means a mass which can be moved relative to the two gratings that are accelerated by the acceleration to be measured, for example relative to an accelerated frame to which the two gratings are fixed.

The inertial force produced by the mass can act on the two gratings directly or indirectly, for example via a force transmission device.

The two Bragg gratings are preferably arranged one behind another in a propagation direction of the optical radiation supplied. For example, these two gratings can be formed one behind another in the propagation direction in an optical conductor made of elastic material for guiding the radiation. The conductor can be, in particular, an optical wave guide, for example an optical glass fiber used in conventional Bragg grating sensors.

In a preferred and advantageous refinement of the device according to the invention, the mass is arranged between the two gratings and connected directly to each of the two gratings so that the inertial force produced by the mass acts directly on the gratings.

The mass can also be connected indirectly to the gratings via a force transmission device in order to convert the inertial force produced by the mass into a force that acts on each grating in such a way that one of the two gratings is extended and, at the same time, the other grating is contracted. In this case, the inertial force acting indirectly on the gratings and/or the extension or contraction of the gratings can be enlarged or reduced.

It is expedient if the force transmission device generates a force which is oriented in the propagation direction and/or the opposite direction and which acts directly on one grating in an extending manner and on the other grating in a contracting manner. For example, in this case the force transmission device can have a lever which can rotate about an axis of rotation that is substantially fixed relative to the device, or another mechanism that acts appropriately.

The two gratings can be formed or prepared in such a way that, in the state in which they are free of inertial force, that is to say in the acceleration-free state of the device, they have the same central Bragg wavelengths. With regard to the possibility of utilizing an advantageous linear characteristic curve range brought about by the two gratings, it is advantageous, however, if the two gratings have mutually different central Bragg wavelengths in the inertial-force-free state, the central Bragg wavelength of one of the two gratings lying within a grating bandwidth of the other grating.

In a refinement of the device according to the invention, at least one of the two Bragg gratings has a fixed grating constant. A particular refinement is in this case distinguished by a fixed grating constant of each of the two gratings. An improved linear characteristic curve range can be obtained with a refinement in which at least one of the two Bragg gratings has a variable grating constant (chirped grating), it being advantageous and expedient if both gratings each have a variable grating constant.

One advantage of the device according to the invention is to be seen in the fact that, during the evaluation of the proportion of the supplied optical radiation, coming from the two gratings, with respect to their grating-specific Bragg wavelengths, it is possible to use a simple broadband optical detector instead of a complicated narrow-band detector. Accordingly, an advantageous refinement of this device has a broadband optical detector for receiving a proportion, coming from both gratings, of the supplied optical radiation.

An advantageous method of operating a device according to the invention has in general terms the following steps:

supplying an optical radiation of a wavelength range containing the central Bragg wavelength of each of the two Bragg gratings to the gratings, and measuring the intensity of a proportion of the supplied radiation coming from the gratings, as a measure of the acceleration to be measured.

An advantageous application of a device according to the invention consists in measuring a mechanical vibration frequency, the vibration frequency being lower than a resonant frequency of the device.

Another advantageous application of a device according to the invention consists in measuring a vibration amplitude of a mechanical vibration frequency which is higher than a resonant frequency of the device.

BRIEF DESCRIPTION OF THE DRAWINGS

The invention will be explained in more detail by way of example in the following description, in conjunction with the appended drawings, in which:

FIG. 1 is a schematic drawing of the basic structure of a device according to the invention having two Bragg gratings, FIG. 2 shows a characteristic curve graph of the device according to FIG. 1, the two Bragg gratings having a fixed grating constant, FIG. 3 shows a characteristic curve graph of the device according to FIG. 1, the two Bragg gratings having a variable grating constant, FIG. 4 shows an embodiment of the device according to FIG. 1, in which the mass is connected to the two gratings via a force transmission device, and FIG. 5 shows an embodiment of the invention in which a plurality of devices according to FIG. 1 are arranged one behind another.

DETAILED DESCRIPTION OF THE INVENTION

The Bragg grating device for measuring an acceleration, illustrated in FIG. 1 and designated generally by the reference numeral 1, has two optical Bragg gratings 11 and 12 each formed of elastic material for supplying optical radiation S, and a deflectable mass M connected to both gratings 11 and 12 for generating an inertial force that is dependent on the acceleration which acts on both gratings 11 and 12. The mass M is connected to the gratings so as to produce elastic extension of one of the two gratings 11 or 12 and simultaneous elastic contraction of the other grating 12 or 11.

The optical radiation S generated by a radiation source 13 is propagated in a direction designated by x in FIG. 1, for example, parallel to the direction at which the acceleration to be measured and designated by a also acts on the two gratings 11 and 12. For example, the acceleration a may be a component of an acceleration which acts on the two gratings 11 and 12 at an angle different from zero in relation to the direction x.

The two Bragg gratings 11 and 12 are preferably arranged one behind another in the propagation direction x, so that a proportion (not illustrated) of the radiation S incident on grating 11 and which has passed through the grating 11, is incident on the grating 12.

For example, the two gratings 11 and 12 are arranged at a distance d from each other in the direction x. In this case, the mass M can be arranged, for example and as indicated in FIG. 1, between the two Bragg gratings 11 and 12 and can be connected directly to each of the two gratings 11 and 12.

If the two gratings 11 and 12 are, for example, accelerated in the direction x with the acceleration a to be measured, the mass M deflected parallel to this direction x relative to the two gratings 11 and 12, generates an inertial force $-F=M \cdot a$, directed opposite to the direction x, and which acts in a contracting manner on the grating 11 and, at the same time, in an extending manner on the grating 12.

If, on the other hand, the two gratings 11 and 12 are accelerated in the direction opposite to the direction x with the acceleration $-a$ to be measured, then the mass M generates an inertial force $F=-M \cdot a$, which acts in the direction x and acts in an extending manner on the grating 11 and, at the same time, in a contracting manner on the grating 12.

Since each of the two gratings 11 and 12 is formed of elastic material, the system jointly comprising the two gratings 11 and 12 and the mass M connected to them can be considered as a mechanical system which consists of two springs 11 and 12 that are elastic in the direction x and the mass M that is connected to these springs, each of the two springs 11 and 12 having a spring constant k1 and k2, respectively, determined by the respective elastic material.

If the two gratings 11 and 12 are formed in material with the same elasticity, then k1=k2. This is the case, for example, if, as indicated in FIG. 1, the two gratings 11 and 12 are formed on a common optical conductor 10 extending in the direction x, and which consists substantially homogeneously of a single elastic material, and in which optical radiation S is supplied to the grating 11 and a proportion of this radiation S that has passed through this grating 11 is supplied to the grating 12.

For example, the conductor 10 is an optical fiber made of glass or plastic, in which the gratings 11 and 12 are formed in a known way. The mass M can be connected to the conductor 10 between the gratings 11 and 12.

Each of the two gratings 11 and 12 has a plurality of grating lines 100 following one another in the direction x and a grating constant c determined by the distance between two respectively adjacent grating lines 100 in the respective grating, the grating constant increasing when the grating 11 or 12 is extended in or counter to the direction x, and decreasing when the grating 11 or 12 is contracted in or counter to the direction x. Accordingly, in each grating 11 and 12, the central Bragg wavelength $\lambda 0$ or $\lambda 0'$ of the respective grating, which depends on the grating constant c and is therefore grating-specific, is displaced in a specific direction, as is known, when the grating 11 or 12 is extended, and is displaced in the direction opposite to this specific direction when the grating 11 or 12 is contracted.

Since, in the present case, one of the two gratings is extended and, at the same time, the other grating is contracted, the respective grating-specific central Bragg wavelengths $\lambda 0$ and $\lambda 0'$ of the two gratings 11 and 12 are displaced in mutually opposite directions.

A grating 11 or 12 can have a fixed or variable grating constant c. In the case of a fixed grating constant c, this constant c, that is to say the distance between two respective grating lines 100 following each other in the direction x, is constant, while in the case of a variable grating constant c, this distance changes.

If two gratings 11 and 12 with the same reflectivity R and a fixed grating constant c in each case are used, the characteristic curve graph shown in FIG. 2 is significant.

In this graph, the difference $\lambda-\lambda 0$ between an optical wavelength $\lambda$ and the central Bragg wavelength $\lambda 0$ of the grating 11 is plotted on the abscissa, and an optical intensity I is plotted on the ordinate.

The curve A in this graph indicates the reflectivity R of the grating 11, which depends on the wavelength difference $\lambda-\lambda 0$, assuming that grating 11 is considered on its own, without taking grating 12 into account, and is irradiated with optical radiation S at the wavelength $\lambda$. The reflectivity R gives the intensity I of the proportion S1 of the optical radiation S supplied to this grating 11, reflected by grating 11 considered alone, as a function of the wavelength different $\lambda-\lambda 0$. In the case of a fixed grating constant c of the grating 11, the reflectivity R can be assumed to follow a Gaussian curve or a similar bell-shaped curve which has a maximum value R0 at $\lambda-\lambda 0=0$. The same is true of the grating 12 of the Bragg wavelength $\lambda 0'$, irradiated with radiation S of wavelength $\lambda$, in which the reflectivity R, that is to say the intensity I that depends on the wavelength difference $\lambda-\lambda 0'$ of the proportion S1 of the supplied optical radiation S, reflected by this grating 12 considered alone, in the case of a fixed grating constant c of this grating 12, can likewise be assumed to be a Gaussian curve or similar bell-shaped curve which has a maximum value at $\lambda-\lambda 0'=0$. In FIG. 2, the curve of the reflectivity R of this grating 12 is not shown, for simplicity.

The bell-shaped curve of the reflectivity R of each such Bragg grating 11 and 12 defines a specific grating bandwidth of this grating in each case, which can be assumed to be the half-value width of this curve, for example. The half-value width is the distance between the two points on this curve which lie at half the maximum value of the curve of the reflectivity R which, in the case of the grating 11, is the curve A in FIG. 2, at which half the maximum value is equal to R0/2 and the grating bandwidth is designated by $\Delta$.

For the previously described curve of the reflectivity R of each grating 11 and 12 it is additionally assumed that the respective grating 11 or 12 is in the state free of inertial force, so that in this state the point $\lambda-\lambda 0=0$ or $\lambda-\lambda 0'=0$ on the abscissa is located specifically at the central Bragg wavelength $\lambda=\lambda 0$ or $\lambda=\lambda 0'$ of the grating 11 or 12.

If the grating 11 or 12 is moved out of the state free of inertial force as a result of extension and/or contraction parallel to the direction x, the entire curve of the reflectivity R, that is to say the curve A in the case of grating 11, is displaced to the right or left along the abscissa, so that following this extension and/or contraction, the maximum value of the curve of the reflectivity R of the grating 11 or 12 is located at $\lambda-\lambda 0\pm\Delta\lambda 0=0$ or, respectively, $\lambda-\lambda 0'\pm\Delta\lambda 0'=0$, the sign of $\Delta\lambda 0$ and $\Delta\lambda 0'$ being determined in accordance with whether there is extension or contraction of the grating 11 or 12, and the magnitude of $\Delta\lambda 0$ and $\Delta\lambda 0'$ depending on the extent of this extension or contraction.

In the case of the curve B of FIG. 2, it is assumed that both gratings 11 and 12 are present, that optical radiation S is supplied to the grating 11 and that the proportion of the radiation S let through by the first grating 11 is incident on the second grating 12. Furthermore, a light source 13 is assumed which generates at least that wavelength $\lambda$ of the grating bandwidth of each grating 11 and 12, both in the state free of inertial force and in each extension and/or contraction state which may occur in this grating 11 or 12.

Although a source 13 generating these wavelengths one after another over time is not ruled out in principle, it is advantageous to use a broadband source 13, which is much simpler to implement, since all these wavelengths are then available simultaneously.

Assuming a broadband source 13, curve B indicates the intensity I, integrated over all the wavelengths $\lambda$ of the broadband source 13, of the reflected proportion S1 of the broadband optical radiation S supplied to the grating 11, originating from both gratings 11 and 12 and coming back from the grating 11 in the direction opposite to the direction x, depending on the difference $\lambda 0'-\lambda 0$ between the selected central Bragg wavelength $\lambda 0'$ of grating 12 and the selected central Bragg wavelength $\lambda 0$ of grating 11.

In the present example of the respectively fixed grating constants c of the gratings 11 and 12, curve B is an inverse bell-shaped curve and has a minimum value R1 at $\lambda 0'-\lambda 0=0$, said minimum value depending on the maximum value R0 of the curve of the reflectivity R of the grating 11.

On the left and right of this minimum value R1 the curve B has a curve branch B1, B2 in each case which rises approximately linearly for some distance from this value R1.

If the two gratings 11 and 12 are selected, for example, such that when free of inertial force they each have the same fixed grating constant c, the same central Bragg wavelength $\lambda0=\lambda0'$ and the same maximum value R0 at the Bragg wavelength $\lambda0=\lambda0'$, the operating point of the two gratings 11 and 12 is located at the minimum value R1 of the curve B, that is to say simultaneous extension of one and contraction of the other of the two gratings 11 and 12 produces a change in the integrated intensity I of the reflected proportion S1 corresponding to the curve B only in the vicinity of this minimum R1. This operating point is suitable for vibration measurements, in which only the amplitude of the oscillation is of interest.

If, by way of contrast, gratings 11 and 12 are used which, in the state free of inertial force, have mutually different central Bragg wavelengths $\lambda0\neq\lambda0'$, the common operating point of the two gratings 11 and 12 can be moved into the approximately linear oblique part of the curve branch B1 or B2 of the curve B, for example to the point P of the curve branch B2 which is illustrated in FIG. 2 and located at $\lambda0'-\lambda0>0$, at which the reflected proportion S1 has the integrated intensity $I_p$.

If, at an operating point selected in this way, the two gratings 11 and 12 are extended and contracted at the same time in opposed directions, the difference $\lambda0'-\lambda0$ between the central Bragg wavelength $\lambda0'$ of the grating 12 and the central Bragg wavelength $\lambda0$ of the grating 11 changes as a function thereof, as a result of which the operating point on the curve B is displaced in one or the other direction with respect to the operating point in the inertial-force-free state of the gratings 11 and 12. In a corresponding way, the integrated intensity of the reflected proportion S1 changes, the change in the integrated intensity being proportional to the slope of the curve B at the inertial-force-free operating point.

With reference to the exemplary inertial-force-free operating point P in FIG. 2, a change in the difference $\lambda0'-\lambda0$ by $\pm\Delta\lambda$ produces a change of $I_p$ by $\pm\Delta I=b\cdot(\pm\Delta\lambda)$, b signifying the positive slope of the curve branch B2 at the point P.

It is ideal to place the operating point in or at least in the vicinity of a point of inflection present in the respective curve branch B1 or B2, since this curve branch B1 or B2 is particularly linear in the vicinity of this point.

In practice, sufficient linearity is achieved, for example, if the magnitude $|\lambda0'-\lambda0|$ is about ⅓ of the grating bandwidth $\Delta$ of the grating 11. The measurable extensions and contractions of the gratings 11 and 12 lie in the range of $\Delta/4$, so that, for example, with a grating 11 with $\Delta=350$ nm at $\lambda0=1550$ nm, a maximum extension or contraction of about 100 $\mu\epsilon$ results.

A curve B with a linearity that is improved as compared with the bell-shaped curve B of FIG. 2 can be obtained if a grating 11 and/or 12 with a variable grating constant c is used. FIG. 3 shows the ideal case of a characteristic curve graph which is achieved, at least approximately, with such gratings.

According to FIG. 3, the curve A of the grating 11 corresponding to the curve A of FIG. 2 is a rectangular function, which is given by $I=R0$ for $\lambda>\lambda0-\Delta/2$ and $\lambda<\lambda0+\Delta/2$ and $I=0$ for all other $\lambda$, $\Delta$ being the grating bandwidth of the grating 11.

The curve B of FIG. 3 corresponding to the curve B of FIG. 2 likewise has a minimum value R1 at $\lambda0'-\lambda0=0$, said value depending on the maximum value R0 of the grating 11. On the left and right of this minimum R1 however, this curve B has a curve branch B1 which is strictly linear between 0 and $-\Delta/2$, and a curve branch B2 which is strictly linear between 0 and $+\Delta/2$.

The common operating point of the two gratings 11 and 12 is moved to the linear curve branch B1 or B2, for example to the point P on the curve branch B2. The measurable extensions and contractions of the gratings 11 and 12 also lie in the range $\Delta/4$ here, but advantageously with a linear characteristic curve and a widened measuring range, since in the case of gratings with a variable grating constant c, the grating bandwidth can be significantly larger as compared with gratings with a fixed grating constant c.

In any case, the mutually different central Bragg wavelengths $\lambda0$ and $\lambda0'$ of the two gratings 11 and 12 should be chosen such that the central Bragg wavelength of one of the two gratings, for example the central Bragg wavelength $\lambda0'$ of the grating 12, lies in a grating bandwidth of the other grating, in the example the grating bandwidth $\Delta$ of the grating 11. The grating bandwidth of a Bragg grating 11 or 12 is generally a range in which the curve of the reflectivity R of this grating 11 or 12 is viewed as being different from zero.

As a result of the curve B having the non-constant but approximately linear curve branch B1 and/or B2 over at least a section, in order to evaluate the proportion S1 of the supplied broadband optical radiation S that comes from the gratings 11 and 12, a broadband optical detector 14 is required. The reflected proportion S1 is supplied to detector 14, for example via an optical coupler 15, from conductor 10.

The device shown in FIG. 4 differs from the device 1 according to FIG. 1 only in the fact that the mass M is not connected directly to the gratings 11 and 12 but indirectly, via a force transmission device 2 in the form of a lever 20 that can be rotated about an axis of rotation 21 that is substantially fixed relative to the device 1.

The axis of rotation 21 is at right angles to the plane of the drawing of FIG. 4 and is produced, for example, by rotatably attaching the lever 20 to a frame 110 of the device 1. The mass M is fixed to a first arm 201 of the lever 20, and a second lever arm 202 is connected to each of the two gratings 11 and 12. The ratio L1/L2 between the length L1 of the first lever arm 201 and the length L2 of the second lever arm 202 determines the transfer function of the force transmission device 2.

An inertial force F or −F produced by the mass M and oriented in or counter to the direction x is converted by the lever 20 into a force −K acting in the direction opposite to the direction x or a force K acting in the direction x. Through the force −K, the grating 11 is contracted and, at the same time, the grating 12 is extended; through the force K, the grating 12 is contracted and, at the same time, the grating 11 is extended.

In the case of the device 1 according to FIG. 4, only those parts which are important for the force transmission device 2 are shown and described; all the other parts of this device 1 are the same as the parts already described and shown in the case of the device 1 of FIG. 1.

It is expedient to prestress the two gratings 11 and 12 in such a way that each grating 11 and 12, in the state free of inertial force, is already elastically preextended up to a certain extent. An already preextended grating may be contracted elastically more easily than a non-preextended grating. Moreover, it is expedient to prestress the optical conductor 10 elastically, so that during the contraction of a grating 11 or 12, only the elastic preextension of the conductor 10 is reduced, and no bending of the conductor 10 occurs. For example, the conductor 10 can be kept prestressed on a frame, like the frame 110 in FIG. 4.

The device 1 according to FIG. 1 or FIG. 4 will in general be operated in such a way that the gratings 11 and 12 are supplied with optical radiation S of a wavelength range containing the central Bragg wavelengths λ0 and λ0' of each of the two gratings 11 and 12, and the intensity I of the proportion S1 of the supplied radiation S coming from the gratings will be used as a measure of the acceleration to be measured.

Since, for example in the vicinity of the operating point of the two gratings 11 and 12, this intensity I depends linearly on the wavelength difference λ0'−λ0, this measured intensity I can be used directly to draw conclusions about the acceleration exerted on the two gratings 11 and 12.

The device 1 according to FIG. 1 or FIG. 4 can advantageously be used as a vibration sensor for measuring a vibration amplitude, if the vibration frequency ω is selected to be higher than an always present resonant frequency ω0 of the entire device 1. At these vibration frequencies ω, the deflection of the mass M is independent of the vibration frequency ω but proportional to the vibration amplitude, which is equal to the deflection of the two gratings 11 and 12 excited into vibration at the vibration frequency ω

The device 1 according to FIG. 1 or FIG. 4 can also be used as an acceleration meter for measuring an acceleration in such a way that the device 1 is excited into vibration at a vibration frequency ω, and the vibration frequency ω is less than a resonant frequency $ω_0$ of the device 1. At these vibration frequencies ω, the deflection of the mass M depends on the vibration frequency ω and therefore on the acceleration. The available frequency range, both in the case of the acceleration meter and in the case of the vibration meter, can be enlarged by means of damping in the vicinity of resonance.

In the case of the device 1 according to FIG. 1 or FIG. 4, the two Bragg gratings 11 and 12 are arranged exactly one behind another in the direction x. However, the principles of the invention applies to devices in which the two Bragg gratings are arranged one behind another in the direction x and/or are arranged beside each other.

In the case of the embodiment shown in FIG. 5, a plurality of devices 1 are arranged in such a way that the respective pairs of gratings, each of which comprises the two gratings 11 and 12 connected to a mass M, are disposed successively on the optical conductor 10.

The pairs of gratings are set to mutually different central Bragg wavelengths λ0=λ1, λ0=λ2, λ0=λ3 and so on. Each pair of gratings is assigned a broadband optical detector 14 each, which is tuned to the respective Bragg wavelength λ0=λ1, λ0=λ2, λ0=λ3, respectively.

The radiation source 13 is constructed to generate broadband optical radiation S which contains all the Bragg wavelengths λ0=λ1, λ0=λ2, λ0=λ3.

The proportion S1 of the radiation S coming from each pair of gratings is coupled out of the conductor 10 by an optical coupler 15 and supplied to the associated detector 14.

If an optical wavelength demultiplexer 16 is used to separate from one another the λ0=λ1, λ0=λ2, λ0=λ3 of the proportions S1 coming substantially jointly from the pairs of gratings, a single coupler 15 is sufficient for the output coupling. The wavelength demultiplexer 16 can be, for example, the grating spectrograph described in U.S. Pat. No. 5,680,489, or an equivalent demultiplexer.

In the case of each device 1 described above, the proportion S1 of the optical radiation S coming from the two gratings 11 and 12 is the proportion reflected by the gratings 11 and 12 proportion S1 can also be the proportion passed through by the two gratings, with the evaluation arrangement modified accordingly.

What is claimed is:

1. An acceleration measuring device comprising
   a pair of optical Bragg gratings arranged at a distance from each other and aligned one behind the other along an optical conductor and formed of elastic material for supplying optical radiation,
   a deflectable mass connected to a part of said optical conductor at said distance between both gratings of said pair such that deflection of the mass in one direction produces simultaneous elastic extension of one of said gratings and elastic contraction of the other of said gratings and deflection of the mass in the opposite direction produces simultaneous elastic contraction of said one of said gratings and elastic extension of said other of said gratings, further wherein the two gratings have mutually different central Bragg wavelengths, and the central Bragg wavelength of one of the two gratings lies in the grating bandwidth of the other grating,
   means for supplying the gratings with optical radiation having a wavelength range including the central Bragg wavelength of each of said pair gratings, and
   means for detecting the intensity of a proportion of the supplied radiation coming from the gratings as a measure of acceleration,
   wherein a portion of the supplied radiation passes through the first grating of said pair of gratings, a portion of said portion of the supplied radiation passing through the first grating is reflected by the second grating of said pair of gratings and reversely passes through the first part of said pair of gratings.

2. The device according to claim 1, wherein at least one of the two Bragg gratings has a fixed grating constant.

3. The device accordingly to claim 1, wherein at least one of the two Bragg gratings has a variable grating constant.

4. The device according claim 1, further comprising a source of optical radiation coupled to said optical conductor and an optical detector coupled to said optical conductor for receiving a proportion of optical radiation from said gratings.

5. The device of claim 4, wherein said source is a source of broadband optical radiation and said detector is a broadband detector.

6. The device according to claim 1, further comprising a plurality of said pairs of gratings formed along said conductor and wherein a separate mass is connected to the gratings of each said pair.

7. A method of measuring acceleration with a device comprising a pair of optical Bragg gratings, and a deflectable mass connected to both gratings of said such that deflection of the mass in one direction produces simultaneous elastic extension of one of said gratings and elastic contraction of the other of said gratings and deflection of the mass in the opposite direction produces simultaneous elastic contraction of said one of said gratings and elastic extension of said other of said gratings, comprising the steps of
   accelerating the device into movement to deflect said mass,
   supplying the gratings with optical radiation having a wavelength range including the central Bragg wavelength of each said pair of gratings, and
   detecting the intensity of a proportion of the supplied radiation coming from the gratings as a measure of acceleration; and further comprising exciting the device into vibration at a mechanical vibration frequency higher than a resonant frequency of the device, whereby the intensity of the proportion of the supplied radiation coming from the gratings is a measure of the vibration amplitude.

* * * * *